US011966411B1

(12) United States Patent
Rajgaria et al.

(10) Patent No.: US 11,966,411 B1
(45) Date of Patent: Apr. 23, 2024

(54) CHANGE DATA CAPTURE LOG AUGMENTATION FOR STREAMLINED ETL PROCESSING

(71) Applicant: Amazon Technologies, Inc., Seattle, WA (US)

(72) Inventors: Punit Rajgaria, Saratoga, CA (US); Murali Brahmadesam, Tiruchirappalli (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/931,281

(22) Filed: Sep. 12, 2022

(51) Int. Cl.
*G06F 16/00* (2019.01)
*G06F 16/21* (2019.01)
*G06F 16/23* (2019.01)
*G06F 16/25* (2019.01)

(52) U.S. Cl.
CPC .......... *G06F 16/254* (2019.01); *G06F 16/213* (2019.01); *G06F 16/2358* (2019.01)

(58) Field of Classification Search
CPC ... G06F 16/254; G06F 16/213; G06F 16/2358
USPC ........................................................ 707/602
See application file for complete search history.

(56) References Cited

U.S. PATENT DOCUMENTS 11,182,275 B1 * 11/2021 Madiraju ............ G06F 11/3688

* cited by examiner

*Primary Examiner* — Chelcie L Daye
(74) *Attorney, Agent, or Firm* — Nicholson Devos Webster & Elliott LLP

(57) ABSTRACT

Techniques for change data capture (CDC) log augmentation are described. In some examples, a user configures CDC log augmentation by indicating which data should be included in a CDC log, and the database, when generating a CDC log associated with this configuration, can obtain the associated data and augment the CDC log by inserting this data into it. The augmented data can include one or more fields from a record in a separate database table, where the record can be identified based on the changed record represented by the CDC log.

20 Claims, 13 Drawing Sheets

DATABASE STATEMENT 202

```
UPDATE    CUSTOMER.ORDERS
SET       STATUS = "SHIPPED",
          LAST_UPDATED = "2022-08-09"
WHERE     ORDER_ID = 54334
```

CHANGE LOG DATA 116

```
{
"METADATA":
{
  "END-TRANSACTION-ID:13941550596478,
  "BINLOG-FILE-NAME": "BINLOG.000001",
  "BINLOG-FILE-OFFSET": 13323,
  "EVENT-TYPE": "UPDATE",
  "CURRENT-EVENT-ID": 1234,
  "PREVIOUS-EVENT-ID": 1220,
  "DB-NAME": "CUSTOMER",
  "TABLE-NAME": "ORDERS",
  "SERVER-ID": 87208,
  "TIMESTAMP": 1689050469,
  "PRIMARY-KEY-COLUMNS: ["ORDER_ID"]
  "PRIMARY-KEY": [54334],
  "QUERY": "UPDATE CUSTOMER.ORDERS SET..."
  "QUERY-ID": 232
},
PAYLOAD: {
  "BEFORE-IMAGE": {
    "ORDER_ID": 54334,
    "STATUS": "PREPARING FOR SHIPMENT",
    "LAST_UPDATED": "2022-08-08",
    "PRODUCT_ID": 1492,
  },
  "AFTER-IMAGE": {
    "ORDER_ID": 54334,
    "STATUS": "SHIPPED",
    "LAST_UPDATED": "2022-08-09"
    "PRODUCT_ID": 1492,
  }
}
```

SUPPLEMENTAL QUERY 204

```
SELECT    PRODUCT_ID, NAME, SKU
FROM      CUSTOMER.PRODUCTS
WHERE     PRODUCT_ID = 1492
```

SUPPLEMENTAL QUERY RESPONSE 206

```
"PRODUCT_ID": 1492
"NAME": "NOVELTY FOAM FINGER"
"SKU": "GBP-1919"
```

*FIG. 2*

DATABASE STATEMENT 202

```
UPDATE    CUSTOMER.ORDERS
SET       STATUS = "SHIPPED",
          LAST_UPDATED = "2022-08-09"
WHERE     ORDER_ID = 54334
```

AUGMENTED CHANGE LOG DATA 316

```
{
"METADATA":
{
  "END-TRANSACTION-ID:13941550596478,
  "BINLOG-FILE-NAME": "BINLOG.000001",
  "BINLOG-FILE-OFFSET": 13323,
  "EVENT-TYPE": "UPDATE",
  "CURRENT-EVENT-ID": 1234,
  "PREVIOUS-EVENT-ID": 1220,
  "DB-NAME": "CUSTOMER",
  "TABLE-NAME": "ORDERS",
  "SERVER-ID": 87208,
  "TIMESTAMP": 1689050469,
  "PRIMARY-KEY-COLUMNS: ["ORDER_ID"]
  "PRIMARY-KEY": [54334],
  "QUERY": "UPDATE CUSTOMER.ORDERS SET..."
  "QUERY-ID": 232
},
PAYLOAD: {
  MAIN TABLE {
    "BEFORE-IMAGE": {
       "ORDER_ID": 54334,
       "STATUS": "PREPARING FOR SHIPMENT",
       "LAST_UPDATED": "2022-08-08",
       "PRODUCT_ID": 1492,
    },
    "AFTER-IMAGE": {
       "ORDER_ID": 54334,
       "STATUS": "SHIPPED",
       "LAST_UPDATED": "2022-08-09"
       "PRODUCT_ID": 1492,
    }
  },
  AUGMENTED TABLE {
    TABLENAME: "PRODUCTS",
    "PRODUCT_ID": 1492,
    "NAME": "NOVELTY FOAM FINGER",
    "SKU": "GBP-1919",
  }
}
```

MAIN TABLE CHANGE DATA 402

AUGMENTED TABLE DATA 404

FIG. 4

CHANGE LOG TABLE 812  902A-902M

| | |
|---|---|
| LSN | 123456 |
| DATABASE_NAME | ABC123.DATABASE1 |
| TRANSACTIONID | 7200 |
| SHARDSEQUENCENUMBER | 3 |
| TIMESTAMP | 2020-01-03 21:59:69.10 |
| EVENTTYPE | UPDATE_ROWS_EVENTV2 |
| EVENTLENGTH | 505 |
| EVENTFLAGS | LOG_EVENT_SUPPRESS_USE_F |
| OFFSETINTRANSACTION | 14 |
| CHANGEDATA | ... |

TRANSACTION TABLE 814  904A-904N

| | |
|---|---|
| TRANSACTIONID | 7200 |
| SHARDSEQUENCENUMBER | 3 |
| COMMITSEQUENCENUMBER: | 7234114782 |
| COMMITSTATUS: | COMMITTED |
| BEGINTRANSACTIONTIMESTAMP | 2020-01-03 21:54:64.30 |
| ENDTRANSACTIONTIMESTAMP | 2020-01-03 22:04:39.13 |
| SERVERID | TABLESERVER1234-35W |
| BEGINLSN | 123455 |
| ENDLSN | 126466 |
| FILENAME | ZXCV23543WDD.LG |
| FILEOFFSET | 14221 |
| LISTOFSHARDS | 2,3,4 |
| TOTALCHANGEDATALENGTH | 55 |

*FIG. 9*

CHANGE DATA CAPTURE LOG AUGMENTATION FOR STREAMLINED ETL PROCESSING

BACKGROUND

The term change data capture (CDC) generally refers to the process of identifying and capturing changes made to data in a database and then providing those captured changes to downstream processes or systems, often in real-time. This can allow multiple systems to be kept in sync with one another, providing for reliable data replication, migrations, and analytics.

Notably, the use of CDC can work well in modern cloud architectures as it provides an efficient way to move data out of a database to another system, such as a data lake, data warehouse, operational datastore, etc. Further, as the data can be moved in near real-time, these replicated systems can be used to support real-time analytics, fraud protection, etc., without impacting the production source databases themselves.

BRIEF DESCRIPTION OF DRAWINGS

Various examples in accordance with the present disclosure will be described with reference to the drawings, in which:

FIG. 2 illustrates an exemplary database statement, change data, supplemental query, and supplemental query response utilized in some examples.

FIG. 4 illustrates an exemplary database statement and augmented change data according to some examples.

FIG. 9 illustrates exemplary change log records and transaction records in a distributed relational database service utilizing split volume types for redo log records and change log records according to some examples.

DETAILED DESCRIPTION

The present disclosure relates to methods, apparatus, systems, and non-transitory computer-readable storage media for change data capture (CDC) log augmentation for streamlined extract, transform, load (ETL) processing according to some examples. In some examples, change log data—such as binlogs—that pertain to a change in a particular database table can be augmented to include data from other database tables, eliminating the need for downstream users of this data to perform separate queries to obtain this data. For example, a record in a table that is updated by a database statement may include a value serving as a foreign key to identify a record from another table, and one or more (or all) of the values of that record can be obtained and included within the change log data pertaining to the update. Thus, for tasks such as ETL or analytics, the downstream user can immediately access the related information without needing to perform additional querying, which can be particularly beneficial and provide significant speedup when such work is being performed in batches. Moreover, the augmentation can be performed with little overhead and possible substantial impact (due to supplemental querying) on the original source database can be avoided.

As is known in the field, CDC logging provides an approach to data integration that is based on the checking, capture, and delivery of the change to the data source interface. Practically speaking, CDC can help users "load" a source table or set of source tables from a database into a data lake for further use. For example, a team may wish to analyze a large amount of data stored in a source database but running queries directly against this "live" production database could result in degradation of performance for production applications that rely upon it. CDC processes can be used to load the needed tables to an external data lake (or other repository), where the users or applications needing access to the data can perform ETL or issue ad-hoc queries against these tables as stored in the data lake (or data warehouse, etc.) for their own analysis purposes. However, as indicated herein, in some cases users must still interact with the source (e.g., production) database, which can be time intensive and impact the production system.

Figure 1:
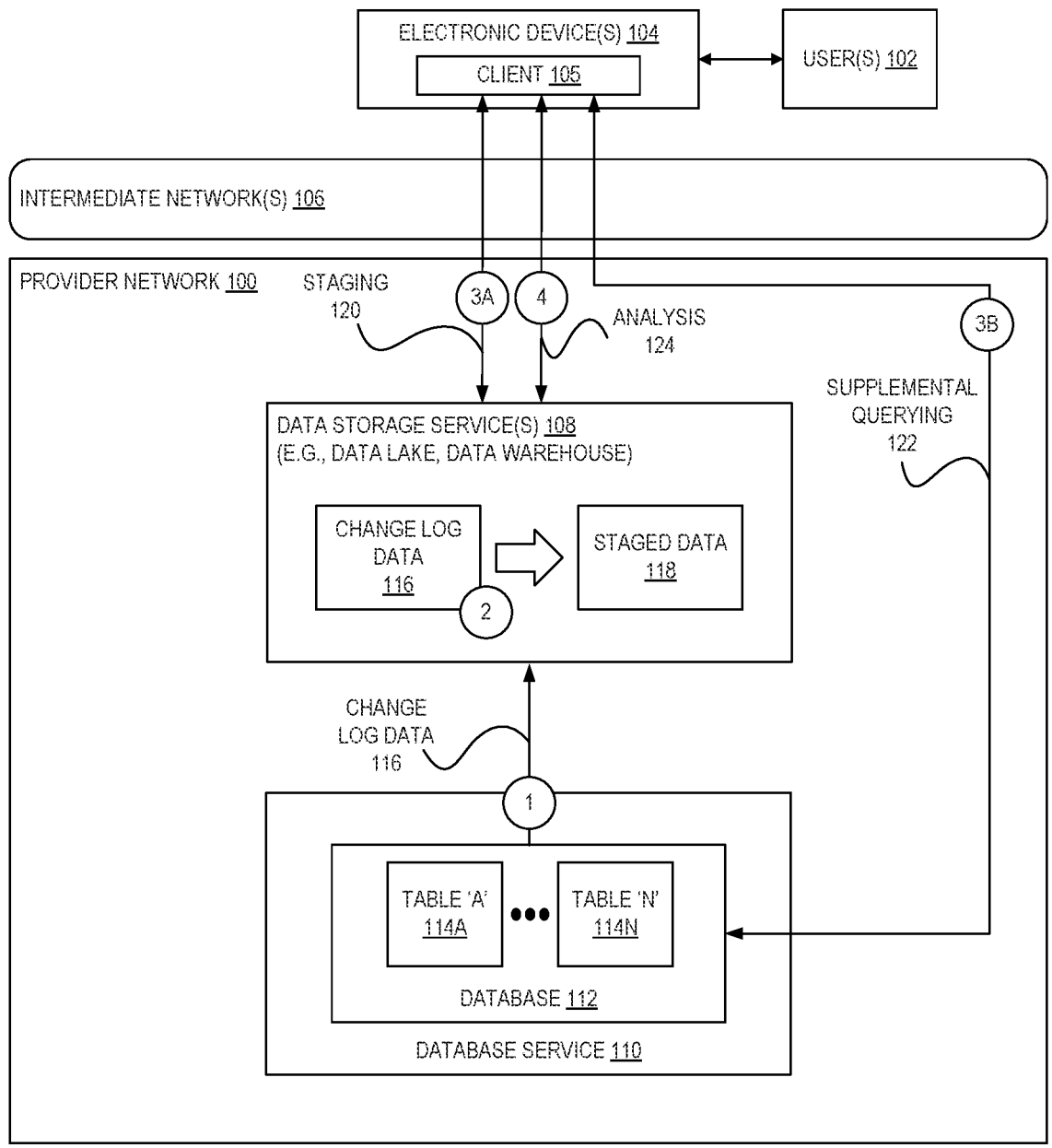
FIG. 1 illustrates an exemplary system depicting multi-stage extract transform load (ETL) processing utilizing supplemental querying according to some examples.

FIG. 1 illustrates an exemplary system depicting multi-stage ETL processing utilizing supplemental querying according to some examples. As shown in this example, a database 112 made up of multiple tables (e.g., table 'A' 114A through table 'N' 114N) is implemented by a database service 110 in a multi-tenant provider network 100.

A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Thus, a provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service 110, etc.

The users 102 (or "customers") of provider networks 100 may utilize one or more user accounts that are associated with a customer account, though these terms may be used somewhat interchangeably depending upon the context of use. Users (e.g., users 102) may use electronic device(s) 104 to interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As shown, the database 112 may be configured to provide change log data 116 (e.g., binlogs) as shown at circle (1) as part of a CDC process. Change log data (e.g., binary log (or "binlog") record data of MySQL-type databases, write ahead log (WAL) data segments of Postgres databases, and the like) are data structure that represent "logical" type change information pertaining to tables of the database (as opposed to physical type change information, such as that involving database pages or other storage structures). This change log data 116 is shown as being sent to a data storage service 108, such as an object storage service, data lake service, data warehouse service, or the like, where it can be stored at circle (2) and operated upon by a client 105, e.g., as part of staging commands 120 shown at circle (3A), where the user 102 is seeking to perform ETL type operations to yield staged data 118 that can be immediately queried or analyzed, moved into a data warehouse or indexed for later querying, etc.

As indicated above, the change log data 116 may include changes for a particular database table of interest, and these records may pertain to (or be associated with) other records stored in other tables. For example, a first table may include a foreign key column storing identifiers that can be used to uniquely identify one (or more) records from a second table. As one example, an e-commerce application may have an "orders" table storing information pertaining to orders placed by customers, and this table could include a "product ID" column serving as a foreign key that references a record in a "products" table for a particular product that is part of the associated order.

With change log data 116 provided for the orders table, an analyst user might need to perform supplemental querying 122 (shown at circle (3B)) to obtain more information about the particular products involved in these orders (e.g., as the products table may not change frequently, and thus not appear in a limited-window of change log changes that are tracked, or the products table itself might not be replicated via CDC) such as a product name, category, SKU, description, or the like, and/or may need to denormalize various tables, to yield the staged data 118 that can be analyzed to obtain the desired information.

For example, an analyst with a company might seek to identify which products sold the most over some recent period of time and may seek to perform analysis using data obtained from the production databases that is populated into the data storage services 108 via use of CDC. Typically, most CDC systems only store data for a limited period of time (e.g., days or weeks) in the data lake or data warehouse, and thus there may only exist changes corresponding to the orders table due to the product table not having changed during this period of time. Thus, though the analyst can examine some information about the particular orders that occurred during this time period, they are unable to gain insights into particular product details with this data alone. The analyst may accordingly use the "product ID" values available in the CDC data for the orders table and query the production database 112 (as supplemental querying 122) to fetch the product data from its product table. Accordingly, additional queries are required for this subsequent analysis 124 (shown at circle (4)), which here involves the use of a production database, and it is possible that many such queries would be needed. As a result, this supplemental querying 122 may impact the production system negatively, or alternatively, such a database may need to be scaled up to accommodate the additional traffic without impacting the production system, which requires additional resources in terms of computing resources, management overhead, cost, etc.

For example, FIG. 2 illustrates an exemplary database statement 202, change log data 116, supplemental query 204, and supplemental query response 206 utilized in some examples. As described above, a database statement 202 that impacts the state of a table (e.g., via a SQL UPDATE, INSERT, DELETE, etc., command) may be executed, which here causes two fields (also referred to herein as columns or attributes) of a record (also referred to as a row) of a database to be updated. Change log data 116 can be constructed for this change as is known to those of skill in the art, e.g., to include a variety of pieces of metadata (here indicating the involved transaction, binlog file name and offset, event IDs, timestamps, and the like) and a "before-image" and "after-image" of a payload indicating the previous values in the affected fields and the updated values of the affected fields—here, changing the "status" field value from "PREPARING FOR SHIPMENT" to be "SHIPPED", and changing the "last_updated" field value from "2022-08-08" to "2022-08-09".

In this example, the change log data 116 includes the value of a foreign key—here, the value of the "product_ID" field of the affected record—that references a particular record in a "products" table. As an analyst may need to obtain information about the associated product(s), this analyst may need to perform supplemental querying via a supplemental query 204 using this value (of "1492") to obtain data about the associated product, such as the product's name and SKU, leading to a result back from the (production) database including the product's name and SKU.

In some examples, this supplemental querying may be more intensive, such as when the foreign key is not readily available to the analyst, who may then issue a more complex query involving use of JOINS (e.g., involving the orders and products tables, via use of the foreign key association) to pull back the desired information. As indicated above, either type of querying introduces delay in the process, can stress the production system leading to performance issues for the primary application, and/or involve adding extra production database resources (e.g., scaling out the database to have additional capacity, in terms of additional nodes or the like) which also requires time and resources.

Figure 3:
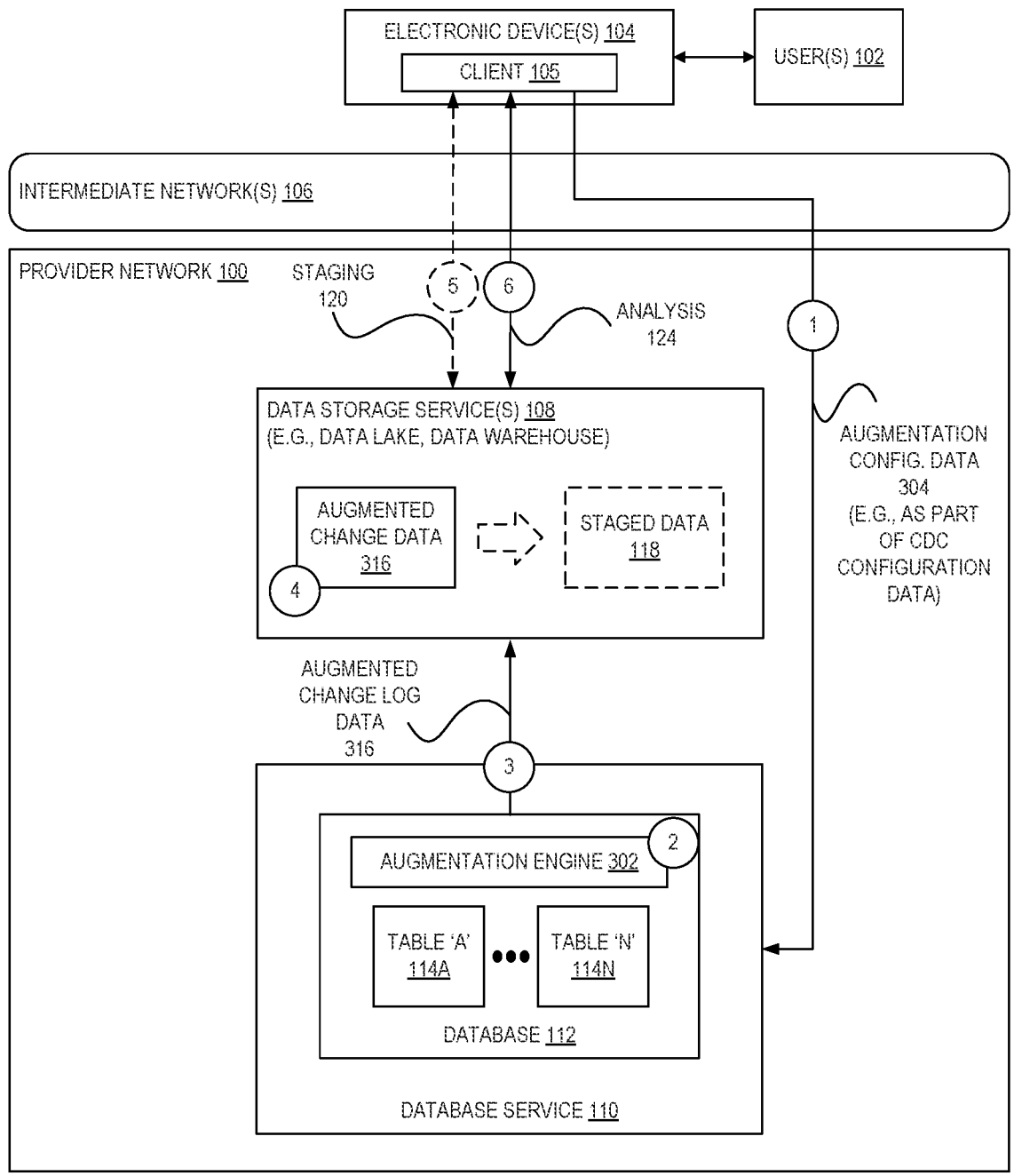
FIG. 3 illustrates an exemplary system utilizing augmented change data capture (CDC) logs for streamlined ETL processing according to some examples.

In contrast, FIG. 3 illustrates an exemplary system utilizing augmented change data capture (CDC) logs for streamlined ETL processing according to some examples. In this example, a user 102 can provide augmentation configuration data 304 (which may be provided as part of CDC configuration data that configures the use of CDC more generally). This augmentation configuration data 304 may be provided or selected by the user via use of a graphical user interface (GUI) such as a console provided by the database service 110, and may allow the user to select which change logs are to be augmented (e.g., those for particular tables), how they are to be augmented (e.g., with what extra information, how to identify this extra information, etc.), and the like, and the data 304 is thus passed at circle (1) via one or more messages (e.g., API calls or other requests) sent by an electronic device 104 of the user 102 to the database service 110, which configures an augmentation engine 302 of the database 112 in response based on this user-selected configuration data.

The augmentation engine 302 can be, for example, a new portion (or module) of the database that typically generates change logs, or a new portion (or module) that operates on change logs generated by another change log generating component. Thus, the augmentation engine 302 can generate augmented change logs from scratch or may augment change logs that are already generated by another component.

Upon executing database statements that change data of the database subject to the creation of augmented change logs, the augmentation engine 302 at circle (2) will create augmented change logs and send this augmented change log data 316 to the data storage service(s) 108 (e.g., selected based on CDC configuration data) for storage at circle (4). Thereafter, the user 102 (e.g., via use of client 105) may optionally perform staging 120 at circle (5) to create staged data 118 (for analysis 124 at circle (6)), or may directly operate on the augmented change data 316 in many use cases—notably, either way without needing supplemental querying to obtain the information that is passed within the augmented change log data, and thus is already available for use.

For further illustration, FIG. 4 illustrates an exemplary database statement 202 and augmented change log data 316 according to some examples. Though this database statement 202 is the same as shown in FIG. D, now the system generates augmented change log data 316 that, in addition to carrying the main table change data 402, also includes additional information selected based on the user-provided augmentation configuration data 304, here including augmented table data 404 providing the "name" and "SKU" from a record of a products table having a same product_ID value (1492) as referenced by the foreign key of the affected record present in the main table change data 402.

Figure 5:
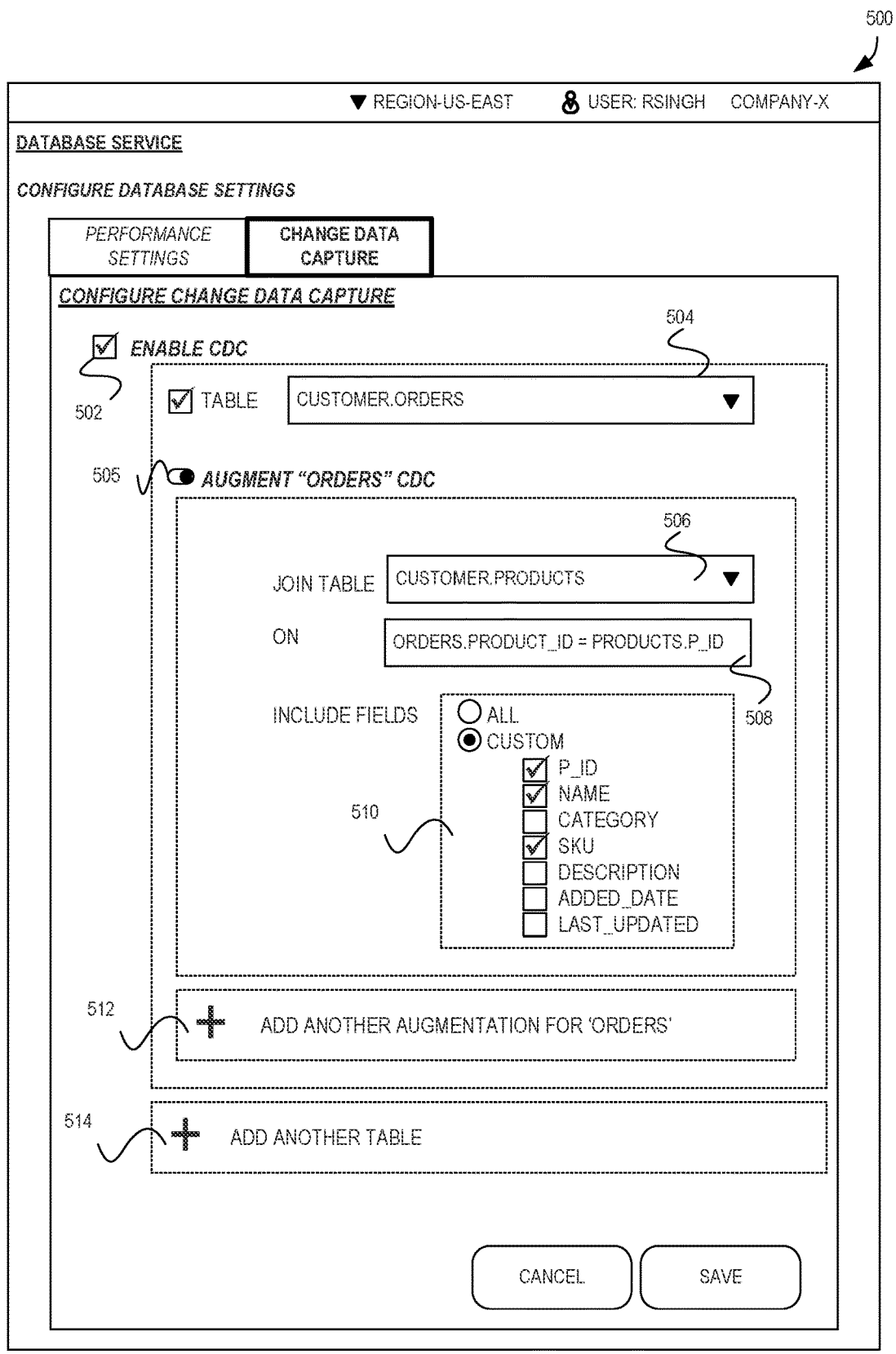
FIG. 5 illustrates an example user interface for obtaining user-specified CDC augmentation configuration data according to some examples.

Notably, this augmentation can be controlled by the users of the provider network and thus can flexibly and powerfully be adapted to particular use cases. In some examples, users can provide augmentation configuration data 304 via use of a graphical user interface (GUI), such as one provided by a console type application provided by the provider network 100. For example, FIG. 5 illustrates an example user interface 500 (e.g., provided by a database service of a cloud provider network) for obtaining user-specified CDC augmentation configuration data according to some examples.

As shown, a user interface 500 includes user interface (UI) elements allowing the user to configure aspects of CDC generally, and/or to configure the augmentation of change logs based on the specific preferences of the user. Of course, various other UIs, UI input elements, etc., can be developed by those of skill in the art to obtain these and other types of configuration data. In this example, a user may use a checkbox-type UI input element 502 to either enable or disable CDC processing, and when enabled, the user may enable CDC processing for particular tables of interest. Here, the user has enabled CDC processing for an "orders" table via use of a drop-down box UI input element 504.

Further, the user can utilize this UI 500 to enable or disable the augmentation of change log data for the associated table (orders) via use of a slider button UI input element 505, and may then provide configuration information indicating from where the augmented data is to come from, e.g., via the "join table" drop-down box UI input element 506, here indicating that data for augmentation is to come from a "products" table of the "customer" database.

The user can also use the UI 500 to provide configuration information indicating how the augmented data is to be identified. As shown, a selection/identification text input UI input element 508 allows the user to provide logic, a query portion, etc., allowing the system to identify which record/row or records/rows of the "products" table are to be used for augmentation. Here, the UI 500 is configured to allow the user to provide a portion of SQL (similar to a familiar "join" type syntax commonly used in SQL queries) that allows the system to identify records of the products table from a value of the affected record in the orders table—here, by defining a foreign key type relationship between the "product_ID" field of the changed "orders" table with a "P_ID" key (possibly a primary key) of the "products" table. However, other mechanisms and/or UI elements can be used in various examples, such as by allowing a user to write a more complete SQL-type statement, seeking a confirmation of an automatically-identified candidate relationship (e.g., by identifying commonly or similarly named columns existing in both tables), etc.

The user can also use the UI 500 to provide configuration information indicating which augmented data is to be included in the augmented change logs. As shown, a set of UI input elements 510 including a pair of radio buttons allows the user switch between including all fields of the identified record (from the products table) or including a custom set of fields of the identified record. When the user seeks to select a custom arrangement of fields, as is shown in this example of FIG. 5, the user may use a set of checkbox UI input elements to select the particular fields of interest—here, a "P_ID" value, a "name" value, and a "SKU" value.

In some examples, the user may also configure additional augmentations for the orders table via UI input element 512, whereby additional sets of augmented table data 404 can be added to augmented change log data 316. In this example, the user can also enable CDC for additional tables via UI input element 514, and optionally configure augmentation for these tables, if so desired.

Flexibly, such change log augmentation techniques can be utilized in many different types of databases and in many different types of settings, whether in relational or non-relational database systems, whether in a cloud service provider or non-cloud service provider environment (e.g., in an organization's "on prem" environment or data center), etc. However, further detail regarding one exemplary deployment possibility is presented herein with regard to a distributed database service of a service provider network.

In some examples, a database (including an augmentation engine 302) can use different volume types (or, "split volumes") for data storage. For example, change log data (e.g., binary log (or "binlog") record data of MySQL, write ahead log (WAL) data segments of Postgres, and the like) that represents comparatively "logical" type change information can be stored in a first set of volumes implemented by an efficient distributed storage, while redo log data records (e.g., InnoDB "redo log" file records) representing more "physical" type database changes can be stored in a separate set of volumes also backed by an efficient distributed storage environment. The use of such disparate volume types can provide significant benefits, including but not limited to improved retrieval of committed change log data without intervention of a database engine, which eliminates bottlenecks in access and allows the database to scale, and improved failure recovery through reduced recovery times and reduced data losses.

Figure 6:
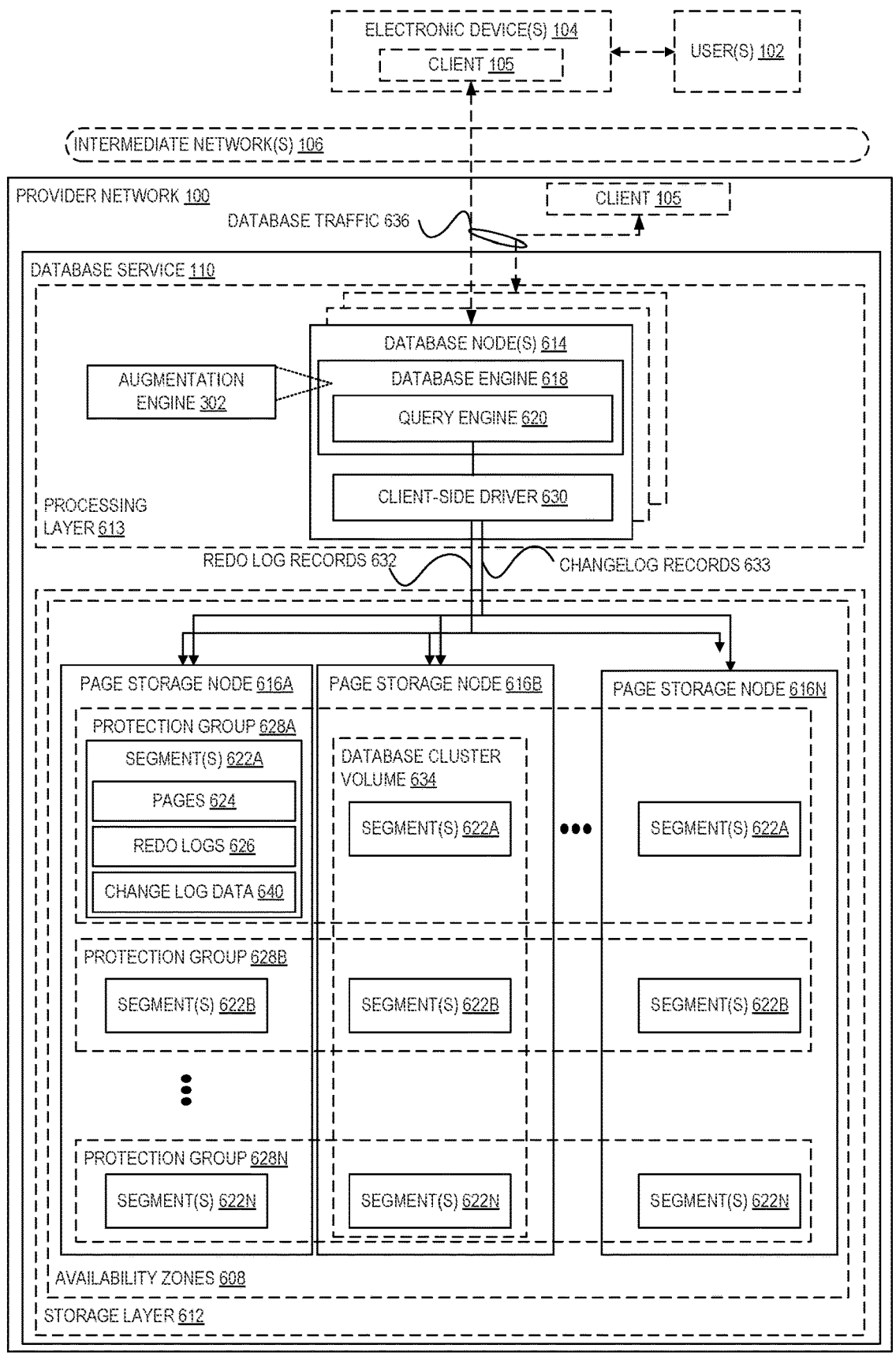
FIG. 6 illustrates an exemplary system including a distributed relational database service provided by a service provider network utilizing network-attached database cluster volumes for redo log record and change log record steams according to some examples.

FIG. 6 illustrates an exemplary system including a distributed relational database service provided by a service provider network utilizing split volumes for redo log record and change log record steams according to some examples. This distributed relational database service can incorporate an augmentation engine 302, which here is shown as part of database engine 618 in a processing layer 613, though also potentially deployed as part of page storage nodes 616 (or later-described data storage nodes of FIG. 7) or a streaming storage server 708 in a storage layer 612).

The provider network 100 illustrated in FIG. 6 includes a database service 110, among any number of other services. According to some examples, the database service 110 enables clients 105 of users to create, manage, and use databases (e.g., relational databases) in a cloud-based environment in a manner that provides enhanced security, availability, and reliability relative to other database environments. In some examples, the database service 110 features a distributed, fault-tolerant, and self-healing storage system that automatically scales (e.g., implemented in part using a scalable storage layer 612). In some examples, a database system provided by a database service 110 organizes the basic operations of a database (e.g., query processing, transaction management, caching, and storage) into multiple tiers or layers that can be individually and independently scalable. For example, in some examples, each database instance provided by the database service 110 includes a database processing layer 613 (which may include one or more database nodes 614, sometimes also referred to as "head nodes"), along with a separate and distributed storage layer 612 (which may include multiple page storage nodes 616 that collectively perform some of the operations traditionally performed in the database processing layer of existing database systems). In some examples, the database service 110 also includes a backup storage layer, etc.

In general, a database is a set of data, collection of records, or other grouping of data objects stored in a data store. In some examples, a data store includes one or more directly or network-attached storage devices accessible to a database engine 618 (e.g., block-based storage devices like hard disk drives or solid-state drives). As indicated above, in some examples, the data store is managed by a separate storage layer 612. In some examples, management of the data store at a separate storage layer 612 includes distributing the data amongst multiple different storage nodes (e.g., page storage nodes 616A-616N) to provide redundancy and availability for the data.

In some examples, the data for a database is stored in one or more portions of the data store, such as data pages 624. One or multiple data values, records, or objects may be stored in a data page. In some examples, data pages further include metadata or other information for providing access to the database. For example, data pages can store data dictionaries, transaction logs, undo and redo log records, and so forth.

Generally, a "redo log" may be a write-ahead log of changes applied to contents of data pages and can provide durability for all changes applied to the pages. Thus, each entry in a redo log may identify information describing a change to a database page, and the log entry can be used to modify a database page from a first state (prior to the change) to a second state (reflective of the change). Thus, the redo log includes "physical" type data reflective of how to change a "physical" representation of a "physical" database page, e.g., in terms of changing data that is stored via these pages. Thus, the redo log generally does not represent higher-level information such as the concept of transactions, tables, etc.

In contrast, a more "logical" type of log, such as a "binlog" (or WAL data segments of Postgres) store change information that is indicative of the type of change occurring in the database from the perspective of a database operation. For example, a binlog can store descriptions of events that indicate the changes made to the database being used, such as updates to values of one or more rows, an operation such as a new table being created or deleted, a column being added or deleted, etc. Binlogs can even provide information on statements that could have led to a potential change. Binlogs can be used to "replay" particular changes or "undo" particular changes to a database without being tied to any particular format or layout of the physical database pages; rather, binlog entries capture logical changes, that is, what database or table or record changes occurred.

A query engine 620 of a database engine 618 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some examples, some operations of a database (e.g., backup, restore, recovery, log record manipulation, and/or various space management operations) are offloaded from the database engine 618 to the storage layer 612 and distributed across multiple storage nodes 616 and storage devices. For example, in some examples, rather than a database engine 618 applying changes to a database (or data pages thereof) and then sending the modified data pages to the storage layer 612, the application of changes to the stored database (and data pages thereof) is the responsibility of the storage layer itself. According to some examples, a database engine 618 may operate using local copies of pages but instead sends "redo log" records, rather than modified data pages, to the storage layer. The storage layer then performs redo processing (e.g., the application of the redo log records) in a distributed manner (e.g., by a background process running on the page storage nodes 616A-616N), e.g., to form pages 624.

In some examples, log sequence numbers (LSNs) are assigned to the redo log records from a log sequence number space. Crash recovery (e.g., the rebuilding of data pages from stored redo log records) in some examples is performed by the storage layer 612 and may also be performed by a distributed background process. The storage layer maintains backup versions of data volumes in a separate storage system (e.g., in another storage service implemented as part of the cloud provider network 100) by leveraging peer-to-peer replication among storage nodes to identify and obtain new updates to data volumes for inclusion in backup versions.

In some examples, because only redo logs (and not modified data pages) are sent to the storage layer from the processing layer 613 there is comparatively much less network traffic between the database processing layer 613 and the storage layer 612 than in typical database systems. In some examples, each redo log may be on the order of one-tenth the size of the corresponding data page for which it specifies a change. Note that requests sent from the database processing layer 613 and the distributed storage layer 612 may be asynchronous and that multiple such requests may be in flight at a time.

In some examples, the database systems described herein may retain much of the structure of the "upper half" of a database instance (e.g., query parsing and query optimization layer, a query execution layer, and a transactionality and consistency management layer) in the processing layer 613 but may redistribute responsibility for at least portions of the backup, restore, snapshot, recovery, and/or various space management operations to the storage layer 612. Redistributing functionality in this manner and tightly coupling log processing between the database processing layer 613 and the storage layer 612 can improve performance, increase availability, and reduce costs when compared to traditional approaches to providing a scalable database, in some examples. For example, network and input/output (I/O) bandwidth requirements may be reduced because only redo log records (which are much smaller in size than actual data pages) may be sent across nodes or persisted within the latency path of write operations. In addition, the generation of data pages can be performed independently in the background on each storage node 616 (as foreground processing allows) without blocking incoming write operations. In some examples, the use of log-structured, non-overwrite storage may allow copy creation, backup, restore, snapshots, point-in-time recovery (PITR), and volume growth operations to be performed more efficiently, e.g., by using metadata manipulation rather than movement or copying of a data page. In some examples, the storage layer 612 may also assume the responsibility for the replication of data stored on behalf of clients (and metadata associated with that data, such as redo log records) across multiple storage nodes. For example, data and metadata of a database may be replicated locally (e.g., within a single availability zone 608 in which a collection of page storage nodes 616 executes on its own physically distinct, independent infrastructure) and across availability zones 608 in a single region or in different regions.

In some examples, database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

In some examples, each data page may be stored in a segment, such that each segment (e.g., segment 622A) stores a collection of one or more pages 624, redo logs 626, and change log data 640. The pages 624 may include data pages constructed based on the redo logs 626 and/or change log pages constructed based on the change log data 640. Thus, change logs and/or redo logs 626 may be segmented to the protection group 628 of which the segment is a member. In some examples, data pages and redo logs and change logs are mirrored across multiple storage nodes, according to a variable configuration, such as in a protection group 628 (which may be specified by the client on whose behalf the databases are being maintained in the database system). For example, in some examples, one, two, or three copies of the data or redo logs or change logs may be stored in each of one, two, or three different availability zones or regions, according to a default configuration, an application-specific durability preference, or a client-specified durability preference.

In some examples, a user's database created using a database service 110 is implemented by one or more database nodes 614, each hosting a database engine (e.g., database engine 618), and a fleet of page storage nodes 616. In some examples, a database engine 618 includes various components associated with a traditional database kernel, including a query engine 620 and other components implementing transactions, locking, buffer cache, access methods, and undo management. In some examples, a database engine 618 receives requests (e.g., queries to read or write data, etc.) from various client 105 applications, parses the requests, optimizes the requests, and develops an execution plan to carry out the associated database operations. In some examples, the database engine 618 returns query responses to client applications, which may include write acknowledgements, requested data pages (or portions thereof), error messages, and other responses as appropriate.

In some examples, a database node 614 is responsible for receiving SQL requests from client applications, e.g., through an Open Database Connectivity (ODBC) or Java Database Connectivity (JDBC) interface, and for performing SQL processing and transaction management (which may include locking) locally. However, rather than generating data pages locally and sending them for storage, the database node 614 (or various components thereof) may both update/generate a data page based on a change but also generate redo log records and send these redo log records to the appropriate page storage nodes 616 of a separate distributed storage system. In some examples, a client-side driver 630 for the distributed storage system hosted on the database node 614 is responsible for routing redo log records 632 to the storage system node(s) 616 that store the segments to which those redo log records 632 are directed.

Additionally, in some cases users of the database service 110 may desire to enable change logs, e.g., in the form of binary logging (or "bin logging") via use of a binlog. Generally, a binlog is one type of change log that may be a set of one or more files containing a record of all statements that attempt to change table data of the database (e.g., updates, insertions, deletions). These statements can be replayed to bring secondary servers up to date in a replication scenario, to bring a database up to date after restoring table data from a backup, etc. In many databases, change logging can be turned on and off, as described earlier herein.

Thus, in some implementations, for database statements that change table data of the database, another stream of data—in the form of change log records 633—is also sent to ones of the page storage nodes 616 and stored as change log data 640. These change logs can be augmented by an augmentation engine 302 of the database engine that creates augmented change log data, which can be efficiently performed as the database engine may have a copy of all needed information in memory (e.g., data from multiple tables), or the database engine can easily obtain any needed information from the storage layer 612 should it not exist in the processing layer 613 at a particular point in time.

However, other possible deployment locations for the augmentation engine 302 exist, such as within a streaming storage server 708. As described herein, a streaming storage server 708 may access change log data (e.g., from data storage nodes 702) and perform the augmentation in an "on the fly" type manner, e.g., by using the augmentation configuration data to guide what data it should obtain for augmentation, and then perform the augmentation just prior to sending it along to a downstream system (e.g., a client 105 or other service). In such a configuration, the augmented change log data need not be stored in a persistent manner by the database whatsoever, whereas it might be the case that when the augmentation engine 302 is in the database engine 618 it sends augmented change log data (e.g., as changelog records 633) to be stored to the table volume 704. However, deploying an augmentation engine 302 in the database engine 618 may reduce In some examples, each segment 622 of a database is replicated (or otherwise made durable) on multiple storage system nodes 616 that form a "protection group." In such examples, the client-side driver 630 tracks the page storage nodes 616 on which each segment is stored and routes redo log records 632 to all of the nodes on which a segment is stored (e.g., asynchronously and in parallel) when a client request is received. As soon as the client-side driver 630 receives an acknowledgment back from a write quorum of the page storage nodes 616 in the protection group (which may indicate that the redo log record has been written to the storage node), it sends an acknowledgment of the requested change to the database processing layer (e.g., to the database node 614). For example, in examples in which data is made durable through the use of protection groups 628, the database node 614 may not be able to commit a transaction until and unless the client-side driver 630 receives a reply from enough page storage nodes 616 to constitute a write quorum, as may be defined in a protection group policy for the data.

In some examples, the database processing layer 613 (or, more specifically, a database node 614) includes a cache in which recently accessed data pages are held temporarily. In such examples, if a write request is received that targets a data page held in such a cache, in addition to sending a corresponding redo log record 632 to the storage layer, the database engine applies the change to the copy of the data page held in its cache. A data page held in this cache may not ever be flushed to the storage layer and may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different examples. Note, however, that in examples that include such a cache, the cache may not be distributed across multiple nodes but may exist only on the database node 614 for a given database instance. Therefore, there may be no cache coherency or consistency issues to manage.

As indicated above, in some examples, a database node 614 includes a client-side storage driver 630, which routes read requests or redo log records 632 to various page storage nodes 616 within the storage layer 612, receives write acknowledgements from the storage layer 612, receives requested data pages from the storage layer 612, or return data pages, error messages, or other responses to a database engine 618. In some examples, the client-side driver 630 running on the database node 614 may expose a private interface to one or more other components (e.g., other database engines or virtual computing service components). In some examples, storage for a database instance in the storage layer may be modeled as a single volume that can grow in size without limits and that can have an unlimited number of Input/Output Operations Per Second (IOPS) associated with it. When a volume is created, it may be created with a specific size, with specific availability/durability characteristics (e.g., specifying how it is to be replicated) and with an IOPS rate associated with it (e.g., both peak and sustained). A variety of different durability models may be supported, and users may be able to specify, for their database, a number of replication copies, availability zones, or regions and whether replication is synchronous or asynchronous based upon their durability, performance, and cost objectives.

In some examples, the client-side driver 630 may maintain metadata about each volume and directly send asynchronous requests to each of the page storage nodes 616 necessary to fulfill read and write requests without requiring additional hops between storage nodes. In some examples, the volume metadata indicates which protection groups 628, and their respective page storage nodes 616, maintain which partitions of the volume. For example, in some examples, in response to a request to make a change to a database, the client-side driver 630 determines the protection group 628, and its one or more page storage nodes 616 that are implementing the storage for the targeted data page, and routes the redo log record(s) 632 specifying that change to those identified storage nodes. The page storage nodes 616 may then be responsible for applying the change specified in the redo log record to the targeted data page at some point in the future. As writes are acknowledged back to the client-side driver 630, the client-side driver 630 may advance the point at which the volume is durable and may acknowledge commits back to the database processing layer, in some examples. As previously noted, in some examples, the client-side driver 630 may not ever send data pages to the page storage nodes 616. This may not only reduce network traffic but may also remove the need for the checkpoint or background writer threads that constrain foreground processing throughout in previous database systems.

In some examples, many read requests may be served by the database node 614 cache. However, write requests may require durability since large scale failure events may be too common to allow only in-memory replication. Therefore, the systems described herein may minimize the cost of the redo log record write operations that are in the foreground latency path by implementing data storage in the storage layer as two regions: a small append-only log-structured region into which redo log records 632 are written when they are received from the database processing layer, and a larger region in which redo log records are coalesced together to create new versions of data pages in the background. In some examples, an in-memory structure may be maintained for each data page that points to the last redo log record for that page, backward chaining redo log records until an instantiated data block is referenced. This approach may provide good performance for mixed read-write workloads including applications in which reads are largely cached.

In some examples, copies of databases may be created in the storage layer that share data pages with the source of the copy. For example, a copy of a portion of a database (e.g., an extent of a database cluster volume 634) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 6, in some examples, the page storage nodes 616 also interface with a separate backup data store, system, service, or device. In this example, various data, such as data pages, redo log records, and any other data maintained by distributed storage service internal clients, such as database service 110 or other virtual computing services, or external clients, may be sent periodically to a backup data store.

In some examples, different storage policies are implemented by the database service 110. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some examples, the storage service may implement a higher durability for redo log records than for data pages, etc.

As indicated above, in some examples, a database service 110 replicates users' databases to provide resiliency to failure. In some examples, a user's database is partitioned into fixed size segments 622, each of which is replicated across the page storage nodes 616. In some examples, each set of fixed sized segments replicated across the page storage nodes 616 is grouped into a "protection group" (e.g., one of protection groups 628), such that each protection group consists of N fixed size segments organized across M availability zones 608. In some examples, a logical database cluster volume 634 used to store the data of a database is thus a concatenated set of protection groups 628, physically implemented using a fleet of storage nodes (e.g., including page storage nodes 616A-616N) provided as virtual hosts with attached SSDs. In some examples, the protection groups that constitute a volume are allocated as the volume grows, where the database service 110 may support volumes that can grow up to a defined size limit (e.g., 64 TB or any other limit).

In some examples, a page storage node 616 includes hardware and software implementing various segment management functions. For example, each storage node may perform any or all of the following operations: replication (e.g., locally within the storage node), coalescing of redo logs to generate data pages, log management (e g, manipulating redo log records), crash recovery (e.g., determining candidate redo log records for volume recovery), creating snapshots of segments stored at the storage node, and space management (e.g., for a segment or state storage). In some examples, each page storage node 616 has one or more attached storage devices (e.g., SSDs, HDDs, or other persistent storage devices) on which data blocks may be stored on behalf of clients.

In some examples, each of the page storage nodes 616 implements processes running on the node that manage communication with one or more database node 614, for example, to receive redo log records 632, send back data pages, etc. In some examples, data blocks written to the storage system may be backed up to long-term or archival storage (e.g., in a remote key-value durable backup storage system).

In some examples, a storage layer 612 implements a storage service control plane that performs various storage system management functions. For example, a storage service control plane may implement a volume manager, which may maintain mapping information or other metadata for a database cluster volume 634, such as current volume state, current writer, truncation tables, or other truncation information, or any other information for a volume as it is persisted in varying extents, segments, and protection groups. In some examples, the volume manager communicates with a client-side driver 630 to "mount" or "open" the volume for the client, providing the client-side driver 630 with mapping information, protection group policies, and various other information used to send write and read requests to page storage nodes 616. The volume manager may provide the maintained information to storage clients, such as a database node 614 or client-side driver 630 or to other system components such as a backup agent. For example, the volume manager may provide a current volume state (e.g., clean, dirty, or recovery), current epoch or other version indicator for the volume, or any other information about a data volume.

FIG. 6 illustrates a process that includes a database node 614 processing database traffic 636. In some examples, clients 105 of the database service 110 may submit queries and other requests associated with a particular database instance in a number of ways, e.g., interactively via an SQL interface to the database system. In some examples, external applications and programs may submit queries using ODBC or JDBC driver interfaces to the database system.

In some examples, database traffic 636 is received and processed by the database instance, where the traffic includes operations that modify the content of the database. In some examples, clients 105 of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client 105 can include a database application, a media application, an office application, or any other application that makes use of persistent storage resources to store and access one or more databases. In some examples, such an application includes sufficient protocol support (e.g., for a suitable version of HTTP) for generating and processing network-based services requests without necessarily implementing full browser support for all types of network-based data. That is, a client 105 may be an application that can interact directly with the cloud provider network 100 or within the cloud provider network 100. In some examples, clients may generate network-based services requests according to a Representational State Transfer (REST)-style network-based services architecture, a document-based or message-based network-based services architecture, or another suitable network-based services architecture. Accordingly, a client 105 may be executed by a computing device 104 outside of the provider network 100 or within the provider network 100 (e.g., as an application executed by a hardware virtualization service, for example).

In some examples, the database traffic 636 is generated by a client 105 application that provides access to storage of databases or other applications in a manner that is transparent to those applications. For example, the client 105 application may integrate with an operating system or file system to provide storage in accordance with a suitable variant of the storage models described herein. However, the operating system or file system may present a different storage interface to applications, such as a conventional file system hierarchy of files, directories, or folders. In such an example, applications may not need to be modified to make sure of the storage system service model. Instead, the details of interfacing to the cloud provider network 100 may be coordinated by the client application and the operating system or file system on behalf of applications executing within the operating system environment. In some examples, the client application generating database traffic 636 send network-based services requests (e.g., a request to create a copy of a database, queries to a database, etc.) to and receive responses from the cloud provider network 100 via one or more intermediate networks 106.

In some examples, a cloud provider network 100 implements various user management features. For example, the cloud provider network 100 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some examples, a cloud provider network 100 also implements financial accounting and billing systems or may maintain a database of usage data that may be queried and processed by external systems for reporting and billing of client usage activity. In some examples, the cloud provider network 100 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some examples, such metrics may be used by system administrators to tune and maintain system components, while in other examples such metrics may be exposed to users to enable such users to monitor their usage of the database service 110 and other services.

In some examples, a cloud provider network 100 also implements user authentication and access control procedures. For example, for a given network-based services request to access a particular database instance, the cloud provider network 100 may ascertain whether the requesting client associated with the request is authorized to access the particular database instance. The cloud provider network 100 may determine such authorization by, for example, evaluating an identity, password, or other credential against credentials associated with the particular database, or by evaluating the requested access to the particular database against an access control list of the particular database, in some examples. For example, if a client does not have sufficient credentials to access a particular database, the cloud provider network 100 may reject the corresponding request, for example, by returning a response to the client indicating an error condition.

As indicated herein, when many traditional databases modify a data page (e.g., in response to a write operation), they generate a redo log record and invoke a log applicator that applies the redo log record to the in-memory before-image of the page to produce its after-image. Transaction commit requires the log to be written, but the data page write may be deferred. As described herein, in some examples of the database service 110, the writes that cross the network are redo log records 632. As shown in FIG. 6, a database engine 618 processing a write sends redo log records 632 to the storage layer 612.

In some examples, the log applicator functionality is implemented at the storage layer 612 where it can be used to generate database pages in the background or on demand Generating each page from the complete chain of its modifications from the beginning of time may be prohibitively expensive and, thus, in some examples, each page storage node 616 continually or periodically materializes database pages in the background to avoid regenerating them from scratch on demand each time. The storage nodes use the redo log records (e.g., redo logs 626 associated with segment 622A) to apply changes to their buffer caches. The database engine awaits quorum from the storage nodes to satisfy the write quorum and to consider the redo log records in question durable or hardened.

As indicated above, database query requests of database traffic 636 typically include requests to write to various data pages of a database instance. These requests are parsed and optimized to generate one or more write record requests, which may be sent to the client-side driver 630 for subsequent routing to the storage system. In this example, the client-side driver 630 generates one or more redo log records 632 corresponding to each write record request and sends them to specific ones of the page storage nodes 616 of specific protection groups 628 storing the partition user data of user data space to which the write record request pertains. In some examples, page storage nodes 616 perform various peer-to-peer communications to replicate redo log records received at a storage node to other storage nodes that may not have received the redo log records. In some examples, the client-side driver 630 generates metadata for each of the redo log records that includes an indication of a previous log sequence number of a log record maintained at the specific protection group.

In some examples, each redo log record 632 is associated with an LSN that is a monotonically increasing value generated by the database. In some examples, a database node 614 continuously interacts with the storage layer 612 and maintains state to establish quorum, advance volume durability, and register transactions as committed. As the database receives acknowledgements to establish the write quorum for each batch of redo log records, it advances the current volume durable LSN (VDL). As noted, a data volume may consist of multiple extents, each represented by a protection group consisting of one or more segments. In some examples, redo log records 632 directed to different extents may have interleaved LSNs. For changes to the volume to be durable up to a particular LSN, it may be necessary for all redo log records up to that LSN to be durable, regardless of the extent to which they belong. In some examples, the client-side driver 630 keeps track of outstanding redo log records that have not yet been made durable, and once all redo log records up to a specific LSN are made durable, it may send a volume durable LSN (VDL) message to one of the protection groups in the volume. The VDL may then be written to all synchronous mirror segments for the protection group.

As described above, in some implementations of a distributed database service 110, (at least) two important streams of data may be sent from the database nodes 614 to the storage layer (e.g., page storage nodes 616)— the redo log records 632 and, if enabled, change log records 633.

As described herein, many users want to utilize the change log, e.g., to track data changes related to change data capture (CDC) for auditing, copying data to another system, reacting to events, performing analytics, etc. However, in many database systems, the use of a change log (e.g., the binlog in MySql) is typically disabled by default. This is partially because, when enabled, the performance of the database goes down significantly—perhaps as much as 75%— which further makes the database not scalable. This is because, for every database transaction, the database engine 618 generates these two streams: redo log records 632 and change log records 633. These records need to be persisted in an atomic manner (e.g., using a "2 phase commit" (2PC) technique), which drops the overall performance of the system significantly. Further, when users need to read this change log data—on top of the writing of the change log data, as well as the writing of the redo logs, and the use of the redo logs for regular database use—the reader occupies a lot of computing resource(s) (e.g., the CPU) of the page storage nodes 616 and/or database nodes 614, and thus the foreground I/O is reduced even further (e.g., as the CPU is less available for regular databases operations). Accordingly, there exists a strong need to enable change logs/binlogging in distributed database systems for replication, auditing, analytics, and other reasons, but without the significant negative effects that arise as a result, such as the typical performance degradations.

Figure 7:
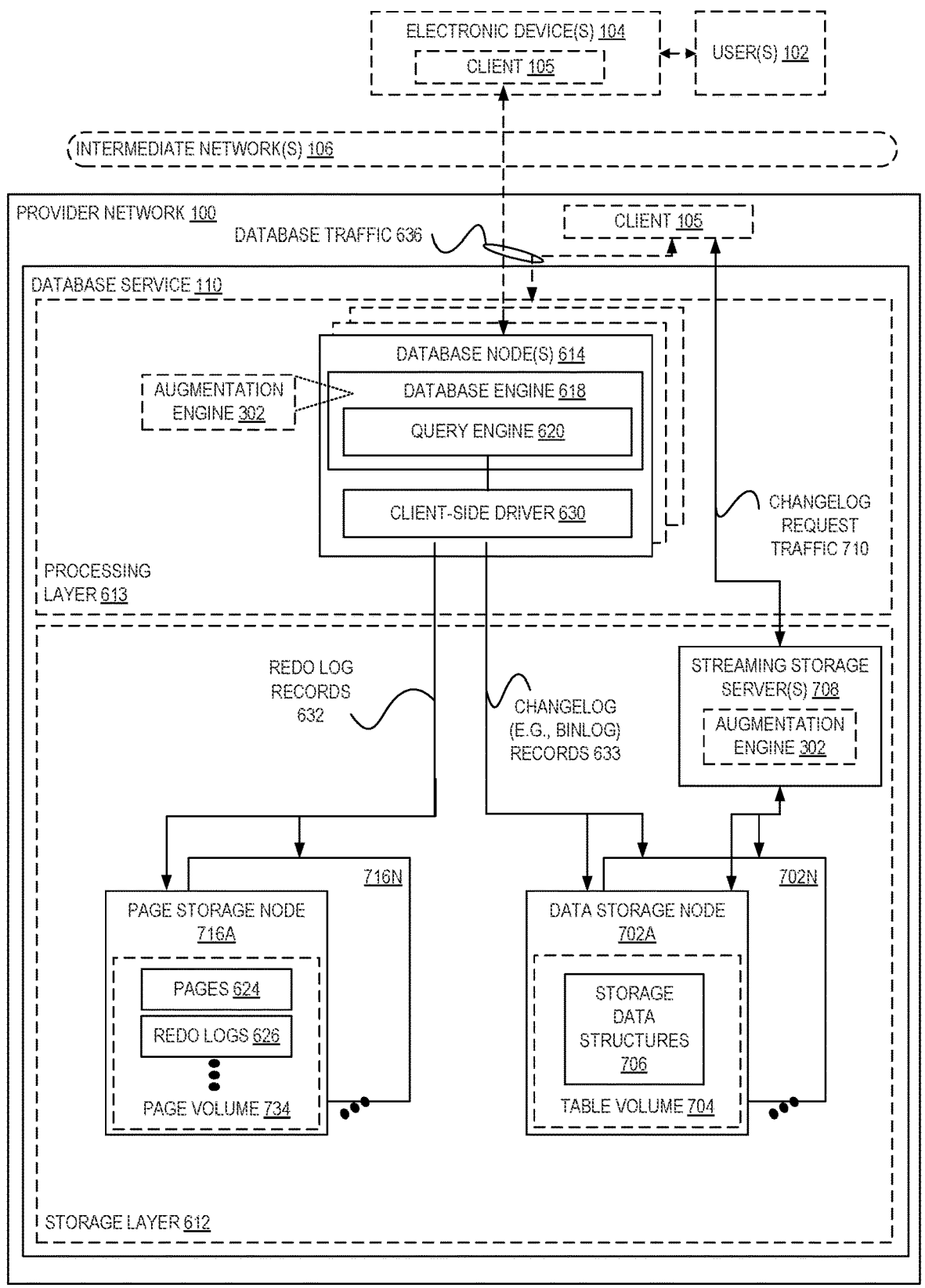
FIG. 7 illustrates an exemplary system including a distributed relational database service provided by a service provider network utilizing split volume types for redo log records and change log records according to some examples.

To this end, FIG. 7 illustrates an exemplary system including a distributed relational database service provided by a service provider network utilizing split volume types for redo log records and change log records according to some examples.

As shown in this figure, in some examples the redo log records 632 may still be written to a first set of one or more database page volumes 734 provided by page storage nodes 716, but the system may utilize a new type of volume—a "table" volume 704 provided by separate set of data storage nodes 702A-702N having storage data structures 706. In this configuration, each data storage node 702 hosting a table volume 704 has one or more storage data structures that may store and/or index individual change log records. As a result, when a database node 614 (or "head node") performs a write to the data (e.g., for an insertion, deletion, update, etc.) of the database, the write can be performed in parallel in that the redo log records 632 are sent to the page storage node(s) 716 and the change log records 633 are sent to the data storage nodes 702. Moreover, examples need not perform these writes in a 2PC process, as when a write happens each gets committed, and a recovery algorithm can handle determining which one happens in what order—i.e., which goes first, second, etc. In some examples, the change log events can be sent as they occur without having to wait for transaction completion, and this architecture produces an advantage in that there is no loss of information in cases where the transaction is rolled back. For example, it is useful to know the number and type of transactions that are rolled back once these transactions have made modifications, which assists application developers with a better design of their solution.

In addition to this parallelism, in some examples reads involving the change log records (e.g., change log request traffic 710) can bypass going through the database nodes 614 and instead be issued directly to one or more streaming storage servers 708, which can directly interact with the data storage nodes 702 to obtain the necessary change log data and return this data to the client 105. As a result, the processing load on both the database nodes 614 as well as the page storage nodes 716 is significantly reduced due to the change log reads and writes being completely removed from their burden.

Figure 8:
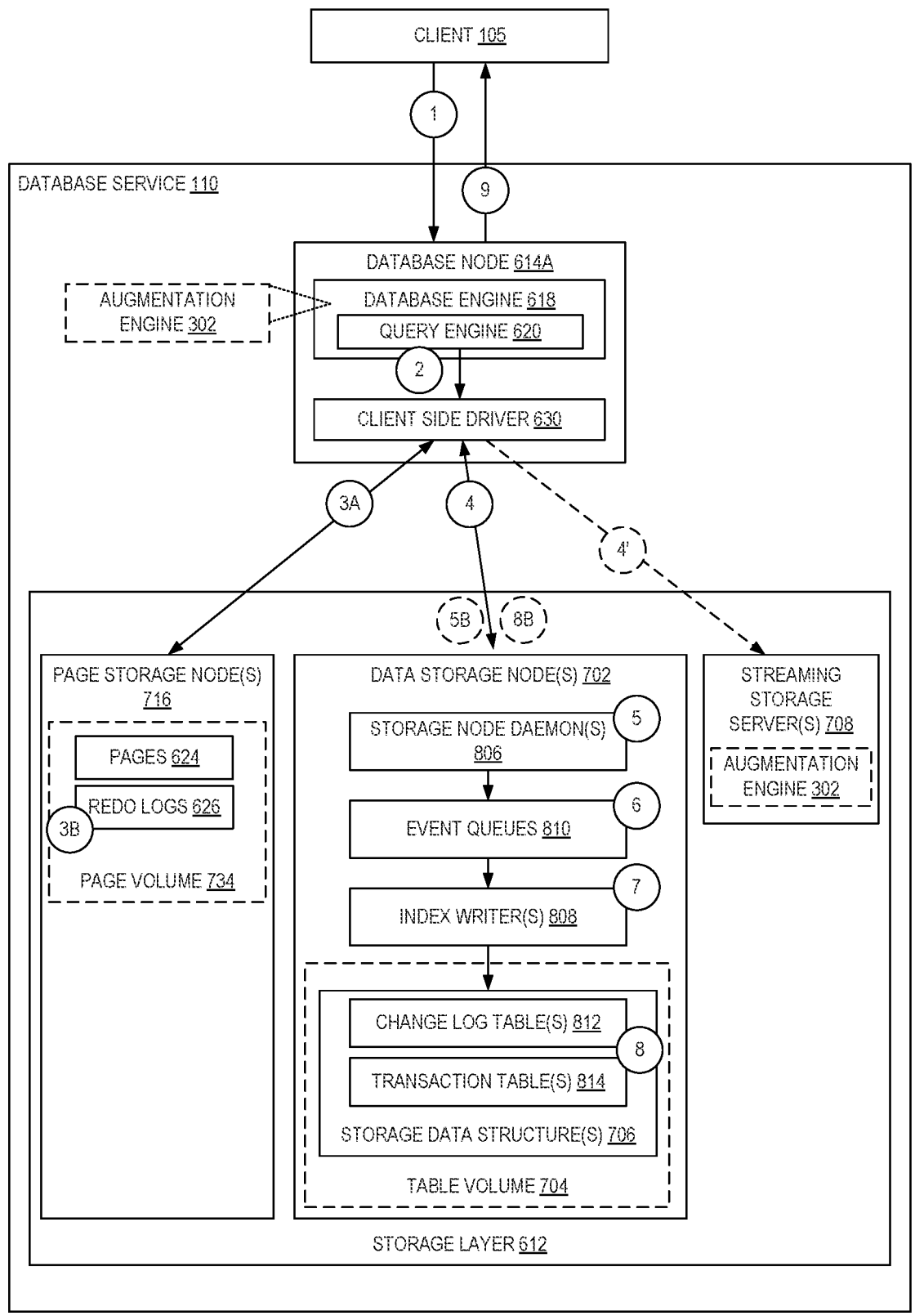
FIG. 8 illustrates an exemplary architecture of a table volume and exemplary write operations in a distributed relational database service utilizing split volume types for redo log records and change log records according to some examples.

For further detail, FIG. 8 illustrates an exemplary architecture of a table volume and exemplary write operations in a distributed relational database service utilizing split volume types for redo log records and change log records according to some examples. At circle (1), a database client 105 interacts with the database by, for example, issuing a SQL statement to a head node (e.g., database node 614A), which may be an UPDATE, DELETE, INSERT, or the like. At circle (2), the database engine 618 processes the request to generate redo log records and change log records (and when dictated by user-provided configuration data, generate augmented change log records). These records are sent to the client-side driver 630, which serves as an interfacing driver between the database engine 618 and the storage layer 612. The client-side driver 630 translates the redo log record(s) into a language that can be interpreted by the page storage node(s) 716, determines which page storage nodes 716 to write to, e.g., based on quorum and any other requirements, and sends, at circle (3A), redo log record writes to one or more database page volumes 734 provided by the page storage nodes 716, which are written to redo logs 626 at circle (3B) as discussed in greater detail above. The client-side driver 630 also sends the change log record writes at circle (4) to one or more data storage nodes 702. These change log records may have been adorned with other data, such as a transaction ID, LSN chain, etc. Prior to sending these records, the client-side driver 630 determines to which data storage nodes 702 the change log events are to be sent to. In some examples, the client-side driver 630 also sends commit records, which may be adorned with data indicating shards (e.g., segments, or portions of segments) where change log events are stored.

The client-side driver 630, when a commit is made durable (e.g., by the data storage nodes 702), notifies the streaming storage server(s) 708 as shown by circle (4')—the streaming storage server(s) may then process the change data request almost immediately.

Upon receipt of a change log record, at circle (5) storage node daemon(s) 806 get the "write" and processes it to cause these records to be stored. For example, in some examples at the daemon(s) 806 create entries in one or more event queues 810 at circle (6), which are serviced at circle (7) by one or more index writers 808. These index writer(s) 808 take the event queue 810 entries and update storage data structures 706 accordingly at circle (8).

For example, in some examples the change log records are stored in a database-like data structure such as a B-Tree or the like forming change log tables 812, which may be indexed with one or more keys. The index writers 808 may also update one or more transaction table 814 data structures with transaction metadata associated with sets of the change log records and may indicate which transactions carrying change log records are or are not committed.

As a result, a number of indexes may be formed over potentially a variety of data entities, such as transactions, change log records themselves, user table identifiers, etc., allowing for various forms of efficient querying.

In some examples, the persistence of the change log records may be acknowledged by the data storage nodes 702 to the client-side driver 630, e.g., after the storage node daemon(s) receive and process the change log records (at circle (5B)) and/or after the index writers 808 have indexed this data (at circle (8B)). Thereafter, when the change log records and the redo logs have been updated, the modification can be reported back to the database client 105 as shown via circle (9).

For further detail, FIG. 9 illustrates exemplary change log records in a change log table 812 and exemplary transaction records in a transaction table 814 in a distributed relational database service utilizing split volume types for redo log records and change log records according to some examples. As indicated above, the data storage nodes 702 may store data pertaining to change log records in one or more data structures, such as change log tables 812, transaction tables 814, etc.

For example, each stored change log record 902A-902M in the change log table 812 may include one or more of the following fields, some or all having come from the change log record and/or its header (populated by the head node): a LSN value, the database name the record pertains to, a transaction ID, a shard sequence number, a timestamp (e.g., of when the statement began executing), an event type (e.g., a type code from the database), an event length indicating a length of the event, any event flags, an offset in the transaction, the actual change log data itself, etc. In some examples, other fields could be extracted from change log events, such as a table name (of the table associated with the event), a column name, etc. In some examples, this table may be indexed over one or more columns—e.g., over transaction ID and/or shard sequence number.

As another example, transaction data pertaining to the change log events may be stored in a transaction table 814 as records 904A-904N. In some examples, each record includes one or more of the following fields: a transaction ID, a shard sequence number, a commit sequence number (the global sequence number of committed transactions), a commit status (e.g., committed or rolled back or started), a begin transaction timestamp, an end transaction timestamp, a server ID of the server that committed the transaction, a begin LSN, an ending LSN, a file name, a file offset, a list of associated shards, a total change data length, etc. In some examples, this table may be indexed over one or more columns—e.g., over the commit sequence number.

With these indexes, a streaming storage server 628 can provide a variety of types of access to the change log data without needing to involve the database nodes 614 or page storage nodes 716. However, in some examples, the operations of the streaming storage server 628 could be implemented in one or more of the database nodes 614, which would beneficially eliminate the need for the storage servers (and thus, easier configuration for the clients) though it may, in comparison to the use of storage servers, increase processing load on the database nodes.

As presented herein, in some examples utilizing multiple volumes, complexity is shifted from the database engine to the storage layer, and the compute resources provided by the storage layer can instead be used for operations such as sorting and indexing. Via use of table volumes, awareness is given to the storage layer about data that gets written, such as the transaction identifier, table name, file offsets, etc.

Thus, data storage nodes can create indexing on these fields, and in some examples, a head database node (or the control plane of the service) can even directly issue queries to the data storage nodes to obtain information that may be helpful in some scenarios. Moreover, logical change data such as binlog data can get written in a completely asynchronous fashion in table volumes 704 while the typical redo logs can be written in a separate page volume 734.

As indicated herein, in some examples a table volume utilizes multiple data structures to maintain its logical data—here, a change log table and a transaction table. Writes of binlog events can occur in the change log table, and once a transaction gets committed, the state may be kept in the transaction table, e.g., the transaction table may store the order of committed transaction. These logical tables can be implemented in a wide variety of formats, such as via use of a key-value data structure, relational database, etc. As indicated above, the change log table could include information such as the LSN of the update, an associated transaction ID, an offset, a length, and the actual change log. Likewise, the transaction table could include information such as a transaction ID, offset, length, file-name, commit LSN, a list of protection groups, etc.

This multi-volume configuration can provide a variety of technical benefits. For example, increase performance is provided in many use cases. As the system may now asynchronously write the binlog, a commit doesn't necessarily need to wait for binlog events to be written. Moreover, the write of transaction log records and binlog events can happen in parallel.

Thus, in some examples, page volumes can be used to store database pages, database engine logs, etc., and do not need to be shared with binlogs, which means any retention period will not be restrained by the size of the page volume.

Moreover, in the case of point-in-time restores (e.g., due to a defunct segment), the restores can be zero-data loss without any "lost" transactions due to having the binlogs on a separate volume, and moreover, recovery time can be drastically reduced—e.g., from minutes to seconds or even fractions of a second.

Figure 10:
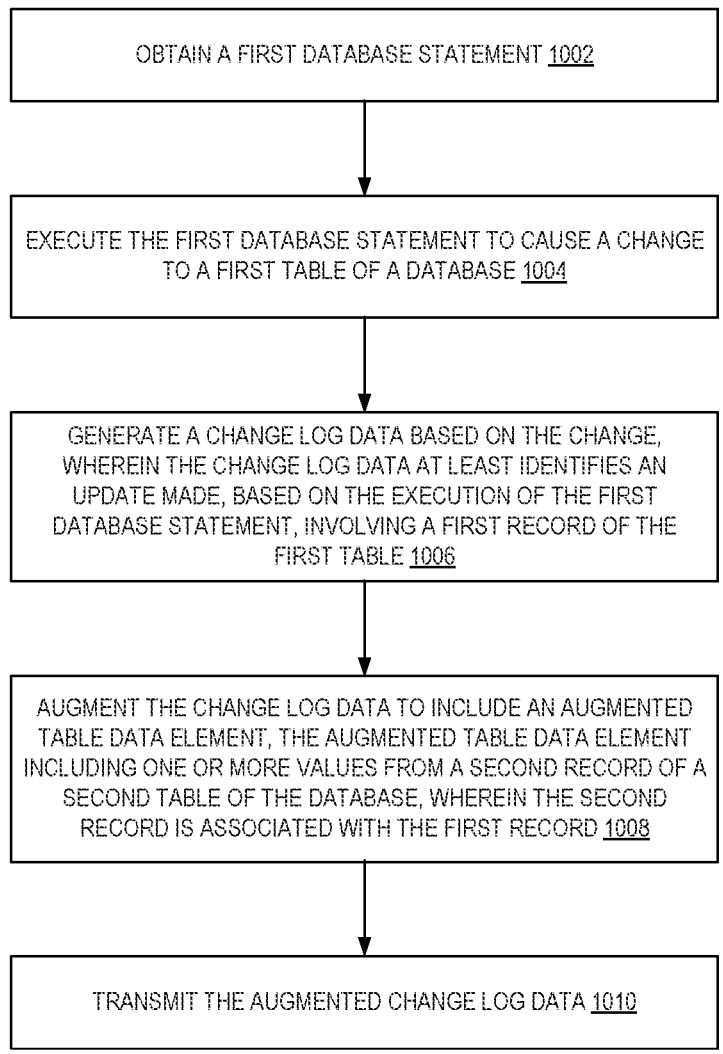
FIG. 10 is a flow diagram illustrating operations of a method for CDC augmentation for streamlined ETL processing according to some examples.

FIG. 10 is a flow diagram illustrating operations of a method for CDC augmentation for streamlined ETL processing according to some examples. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by the database service 110 (e.g., in whole or in part by a database node 614, augmentation engine 302, etc.) of the other figures.

The operations 1000 include, at block 1002, obtaining a first database statement, and at block 1004, executing the first database statement to cause a change to a first table of a database.

The operations 1000 further include, at block 1006, generating a change log data based on the change, wherein the change log data at least identifies an update made, based on the execution of the first database statement, involving a first record of the first table. In some examples, the change log data comprises a binlog file.

The operations 1000 further include, at block 1008, augmenting the change log data to include an augmented table data element, the augmented table data element including one or more values from a second record of a second table of the database, wherein the second record is associated with the first record.

The operations 1000 further include, at block 1010, transmitting the augmented change log data.

In some examples, the operations 1000 further include receiving a user-specified configuration data, the configuration data indicating that changes made to the first table are to be included in change data capture (CDC) logging.

In some examples, the user-specified configuration data further indicates that data from the second table is also to be included in change log data for the first table that is generated as part of the CDC logging. In some examples, the operations 1000 further include transmitting data to cause a graphical user interface (GUI) to be presented, wherein the user-specified configuration data is provided via the GUI. In some examples, the user-specified configuration data identifies how the data from the second table is to be identified for inclusion in the change log data. In some examples, the user-specified configuration data indicates that records from the second table are to be selected for inclusion in CDC logging for the first table via use of a foreign key relationship, whereby a value from each record in the first table serves as a foreign key to identify one or more records of the second table. In some examples, the user-specified configuration data indicates which fields from records of the second table are to be included, or not included, in the CDC logging for the first table.

In some examples, the obtaining, executing, generating, and augmenting are performed by a database engine in a processing layer of a database service implemented in a multi-tenant service provider network; and the augmented change log data is transmitted, by the database engine, to a storage node in a separate storage layer of the database service. In some examples, the operations 1000 further include transmitting the augmented change log data to a data lake, data warehouse, or client application. In some examples, the storage node implements a table volume that stores change log data, and wherein the database service further includes one or more page storage nodes implementing a page volume that stores physical change log data and materializes database pages.

In some examples, the obtaining, the executing, and the generating are performed by a database engine in a processing layer of a database service implemented in a multi-tenant service provider network; the augmenting and the transmitting are performed by a streaming server of the database service; and the augmented change log data is transmitted, by the streaming server, to a client or a separate service of the provider network.

Figure 11:
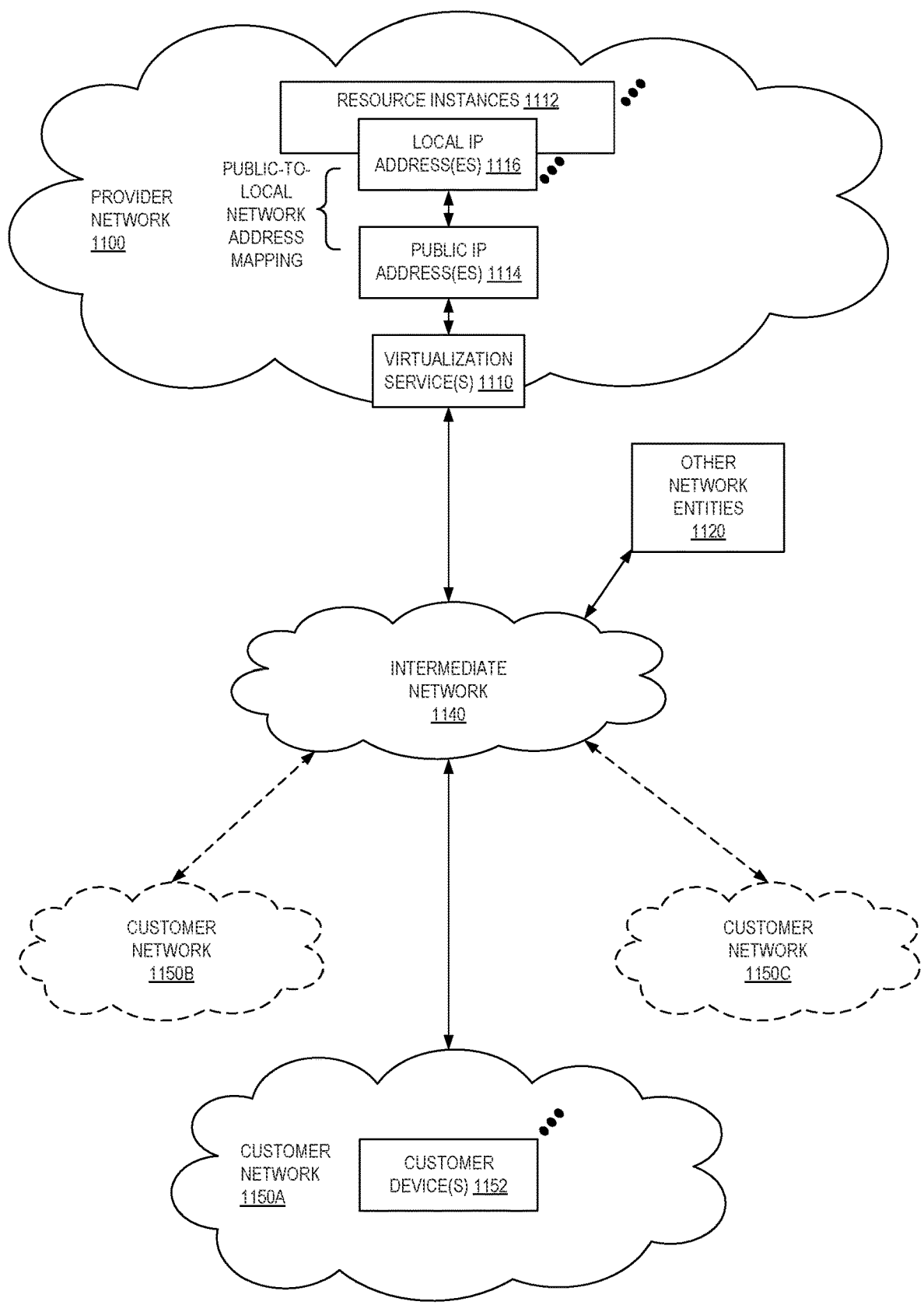
FIG. 11 illustrates an example provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
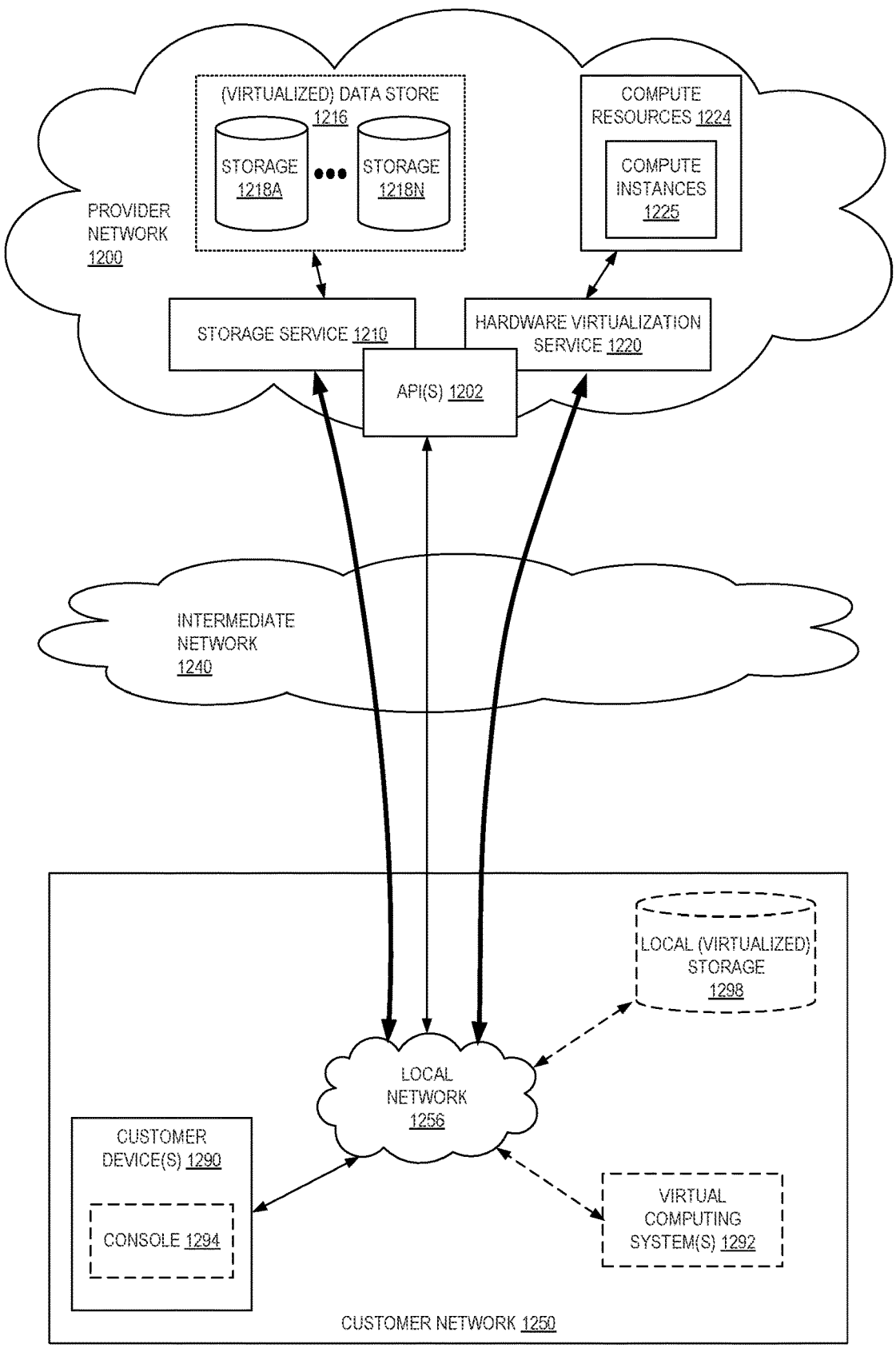
FIG. 12 is a block diagram of an example provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
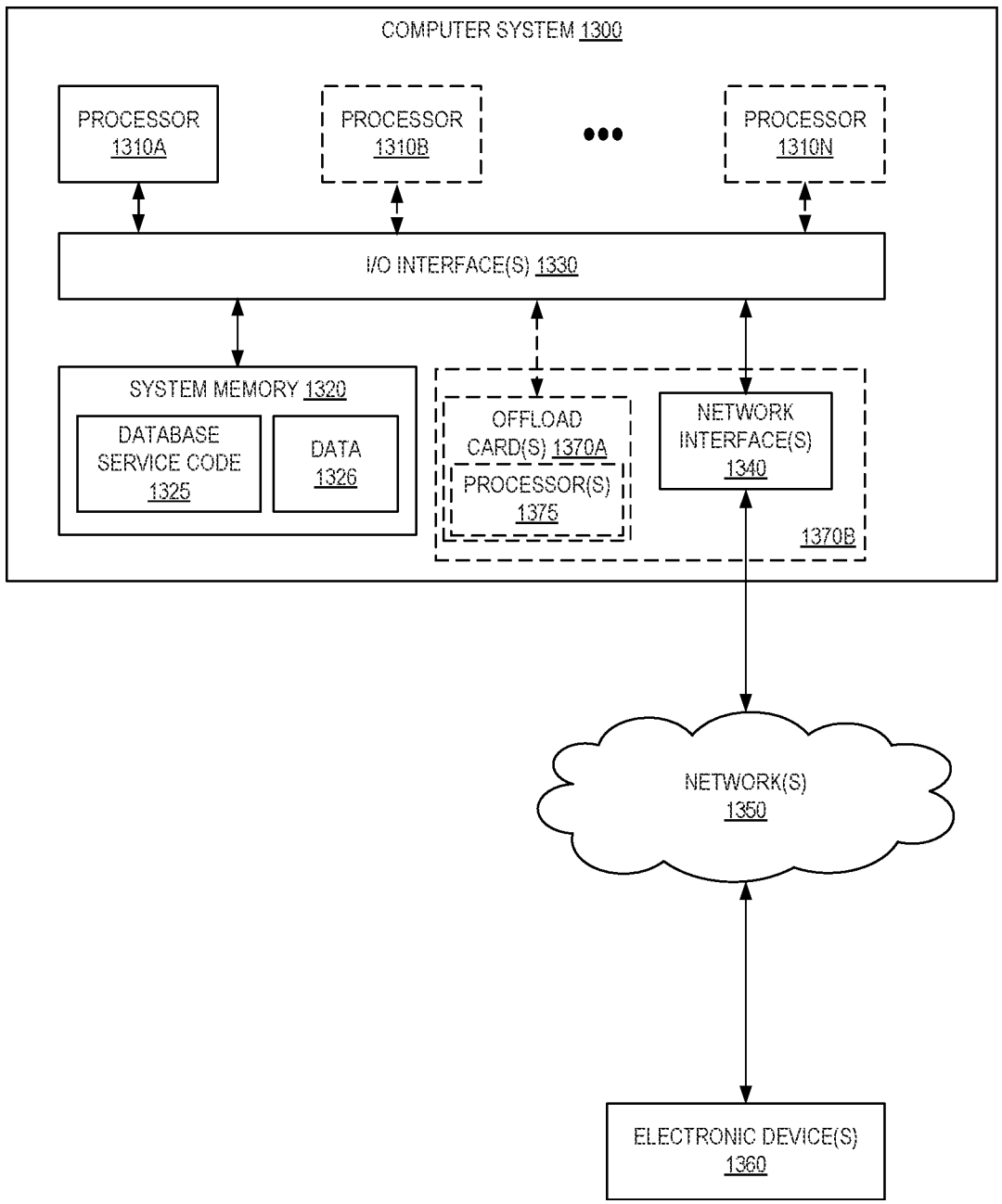
FIG. 13 is a block diagram illustrating an example computer system that can be used in some examples.

In some examples, a system that implements a portion or all of the techniques described herein can include a general-purpose computer system, such as the computer system 1300 illustrated in FIG. 13, that includes, or is configured to access, one or more computer-accessible media. In the illustrated example, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various examples the computer system 1300 can include one computing device or any number of computing devices configured to work together as a single computer system 1300.

In various examples, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as database service code 1325 (e.g., executable to implement, in whole or in part, the database service 110) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 6, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computer system 1300. However, in some examples the virtualization manager implemented by the offload card(s) 1370A or 1370B can accommodate requests from other entities (e.g., from compute instances themselves), and cannot coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1218A-1218N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    receiving, at a multi-tenant database service of a service provider network, a user-specified configuration data indicating that changes made to a first table of a database are to be included in change log data generated as part of change data capture (CDC) logging and further indicating that data from a second table is also to be included, in the change log data for the first table, that is generated as part of the CDC logging;
    obtaining a first database statement to be executed using the database;
    executing the first database statement to cause a change to a first record of a first table of the database;
    generating a change log data based on the change, wherein the change log data at least identifies an update made, based on the execution of the first database statement, involving the first record of the first table;
    augmenting the change log data to include an augmented table data element, the augmented table data element including one or more values from a second record of the second table of the database, wherein the second record is associated with the first record; and
    transmitting the augmented change log data to a storage node of the database service.

2. The computer-implemented method of claim 1, wherein the user-specified configuration data indicates that records from the second table are to be selected for inclusion as part of the CDC logging for the first table via use of a foreign key relationship, whereby a value from each record in the first table serves as a foreign key to identify one or more records of the second table.

3. The computer-implemented method of claim 1, further comprising transmitting the augmented change log data to a data lake, data warehouse, or client application that is distinct from the database service.

4. A computer-implemented method comprising:
    obtaining a first database statement;
    executing the first database statement to cause a change to a first table of a database;
    generating a change log data based on the change, wherein the change log data at least identifies an update made, based on the execution of the first database statement, involving a first record of the first table;
    augmenting the change log data to include an augmented table data element, the augmented table data element including one or more values from a second record of a second table of the database, wherein the second record is associated with the first record; and
    transmitting the augmented change log data.

5. The computer-implemented method of claim 4, further comprising:
    receiving a user-specified configuration data, the configuration data indicating that changes made to the first table are to be included in change data capture (CDC) logging.

6. The computer-implemented method of claim 5, wherein:
the user-specified configuration data further indicates that data from the second table is also to be included in change log data for the first table that is generated as part of the CDC logging.

7. The computer-implemented method of claim 6, further comprising:
transmitting data to cause a graphical user interface (GUI) to be presented, wherein the user-specified configuration data is provided via the GUI.

8. The computer-implemented method of claim 6, wherein the user-specified configuration data identifies how the data from the second table is to be identified for inclusion in the change log data.

9. The computer-implemented method of claim 8, wherein the user-specified configuration data indicates that records from the second table are to be selected for inclusion in CDC logging for the first table via use of a foreign key relationship, whereby a value from each record in the first table serves as a foreign key to identify one or more records of the second table.

10. The computer-implemented method of claim 6, wherein the user-specified configuration data indicates which fields from records of the second table are to be included, or not included, in the CDC logging for the first table.

11. The computer-implemented method of claim 4, wherein:
the obtaining, executing, generating, and augmenting are performed by a database engine in a processing layer of a database service implemented in a multi-tenant service provider network; and
the augmented change log data is transmitted, by the database engine, to a storage node in a separate storage layer of the database service.

12. The computer-implemented method of claim 11, further comprising:
transmitting the augmented change log data to a data lake, data warehouse, or client application.

13. The computer-implemented method of claim 11, wherein:
the storage node implements a table volume that stores change log data, and wherein the database service further includes one or more page storage nodes implementing a page volume that stores physical change log data and materializes database pages.

14. The computer-implemented method of claim 4, wherein:
the obtaining, the executing, and the generating are performed by a database engine in a processing layer of a database service implemented in a multi-tenant service provider network;
the augmenting and the transmitting are performed by a streaming server of the database service; and
the augmented change log data is transmitted, by the streaming server, to a client or a separate service of the provider network.

15. A system comprising:
a first one or more electronic devices to implement a storage node of a database service in a multi-tenant provider network, the storage node to store logical change data; and
a second one or more electronic devices to implement a database engine of a database node of the database service, the database engine including instructions that upon execution cause the database engine to:
obtain a first database statement;
execute the first database statement to cause a change to a first table of a database;
generate a change log data based on the change, wherein the change log data at least identifies an update made, based on the execution of the first database statement, involving a first record of the first table;
augment the change log data to include an augmented table data element, the augmented table data element including one or more values from a second record of a second table of the database, wherein the second record is associated with the first record; and
transmit the augmented change log data to the storage node be stored as part of the logical change data.

16. The system of claim 15, wherein the database engine further includes instructions that upon execution cause the database engine to:
receive a user-specified configuration data, the configuration data indicating that changes made to the first table are to be included in change data capture (CDC) logging, and the configuration data further indicating that data from the second table is also to be included in change log data for the first table that is generated as part of the CDC logging.

17. The system of claim 16, wherein the user-specified configuration data identifies how the data from the second table is to be identified for inclusion in the change log data.

18. The system of claim 17, wherein the user-specified configuration data indicates that records from the second table are to be selected for inclusion in CDC logging for the first table via use of a foreign key relationship, whereby a value from each record in the first table serves as a foreign key to identify one or more records of the second table.

19. The system of claim 16, wherein the user-specified configuration data indicates which fields from records of the second table are to be included, or not included, in the CDC logging for the first table.

20. The system of claim 15, wherein the database service is to transmit the augmented change log data to a data lake, data warehouse, or client application.

\* \* \* \* \*